(12) United States Patent
Smolenski et al.

(10) Patent No.: US 6,950,605 B1
(45) Date of Patent: Sep. 27, 2005

(54) METHOD AND APPARATUS FOR RECORDING REAL-TIME AUDIO/VIDEO INFORMATION ONTO RECORDABLE COMPACT DISC DRIVES

(75) Inventors: Michael J. Smolenski, East Palo Alto, CA (US); John Yen-Hsu Su, Santa Clara, CA (US)

(73) Assignee: Cirrus Logic, Inc., Austin, TX (US)

( * ) Notice: Subject to any disclaimer, the term of this patent is extended or adjusted under 35 U.S.C. 154(b) by 1062 days.

(21) Appl. No.: 09/738,135

(22) Filed: Dec. 15, 2000

(51) Int. Cl.[7] ............................................. H04N 5/91
(52) U.S. Cl. ..................................... 386/126; 386/112
(58) Field of Search ........................ 386/46, 109, 111, 386/112, 125, 126; 704/278

(56) References Cited

U.S. PATENT DOCUMENTS 5,579,121 A * 11/1996 Ohta et al. .................. 386/109
5,974,223 A * 10/1999 Uchide ........................ 386/109
6,101,474 A *  8/2000 Fujibayashi ................. 704/278
6,768,864 B1 *  7/2004 Kimura et al. .............. 386/111

FOREIGN PATENT DOCUMENTS

JP         09-046907       *  2/1996

* cited by examiner

*Primary Examiner*—Huy Nguyen
(74) *Attorney, Agent, or Firm*—Steven Lin, Esq.

(57) ABSTRACT

In one embodiment of the present invention an apparatus and method is disclosed for recording audio/video information onto a compact disc recorder in real-time. The audio/video information is streamed at a constant rate from a source having an output buffer and so as to prevent overflowing of the output buffer, the streamed audio/video information is received at a constant rate for storage into an input buffer, the streamed audio/video information is for recording thereof onto the compact disc recorder so as to prevent underflowing of the input buffer.

18 Claims, 4 Drawing Sheets

METHOD AND APPARATUS FOR RECORDING REAL-TIME AUDIO/VIDEO INFORMATION ONTO RECORDABLE COMPACT DISC DRIVES

BACKGROUND OF THE INVENTION

1. Field of the Invention

The present invention relates generally to a method and apparatus for recording real-time audio/video information onto recordable compact disc drives and particularly to achieving data consumption equilibrium to effectuate such real-time recording.

2. Description of the Prior Art

Most recordable compact disc drives are designed and optimized for use by Personal Computer (PC) with the source of the data to be recorded being either a hard disc drive or another recordable compact disc (CD-R) drive. In the latter cases, the size of the source data is fixed prior to the beginning of recording and is not transmitted in real-time to the media in which the source data is to be recorded.

In fact, currently, there are no known systems or methods for recording onto a CD-R drive from a source that generates data in real-time. Examples of such a source are an audio/video Motion Picture Expert Group (MPEG) board that captures audio/video information in real-time, compresses the same and records the compressed information in real-time to the CD-R drive. In such examples, the source data is transmitted at a predetermined average bit rate so that even though the transmission is in real-time, there is no variation in the data rate but the instantaneous size of data in the output buffer of the source is typically unknown. Since a CD-R drive has an input buffer that is fixed in size, there are a number of known problems with recording real-time data using prior art techniques. That is, data to be recorded must be transmitted to the compact disc drive at a fixed or constant rate, as this is done in real-time, similarly, the compact disc drive receives data at a fixed rate, in real-time. This creates a problem in that the rate of transmission and reception is not quite fixed at all times. Also, since there are typically 99 tracks in a CD, the data must be streamed as much as possible.

Another problem is preventing the source buffer from either overflowing or underflowing to ensure against the corruption of information being transmitted for recording. Another problem is preventing the CD-R buffer from either overflowing or underflowing to ensure against the corruption of information being recorded. Another issue with prior art systems and methods is the slow response time associated with starting and stopping of recording. That is, for example, using digital video recorders, when the record button is pressed, one would prefer the recording session to "start" immediately so that no information that is to be recorded is missed. Similarly, when the "stop" button is pressed, one would prefer that the recording session to stop immediately so as to prevent recording of undesirable information. Unfortunately however, compact disc drives designed for the traditional PCs have a slow response time due to having a large buffer size.

FIG. 1 shows a graph of buffer fullness vs. time for a prior art compact disc drive recorder device in a PC system. When recording starts, it takes to time until the input buffer is full and the drive operates in "steady-state", where the input buffer oscillates between $S_{min}$ and $S_{max}$ values, during which time information or data can be accurately recorded.

Therefore, the need arises for accurately recording information transmitted in real-time on a compact disc drive without missing or corrupting the information to be recorded as a result of overflow or underflow of the source of the information to be recorded or overflow or underflow of the compact disc drive and to do so with minimal start up and stop recording time.

SUMMARY OF THE INVENTION

Briefly, in accordance with one embodiment of the present invention, an apparatus and method is disclosed for recording audio/video information onto a compact disc recorder in real-time. The audio/video information is streamed at a constant rate from a source having an output buffer and so as to prevent overflowing of the output buffer, the streamed audio/video information is received at a constant rate for storage into an input buffer, the streamed audio/video information is for recording thereof onto the compact disc recorder so as to prevent underflowing of the input buffer.

The foregoing and other objects, features and advantages of the present invention will be apparent from the following detailed description of the preferred embodiments which make reference to several figures of the drawing.

IN THE DRAWINGS

Figure 6:
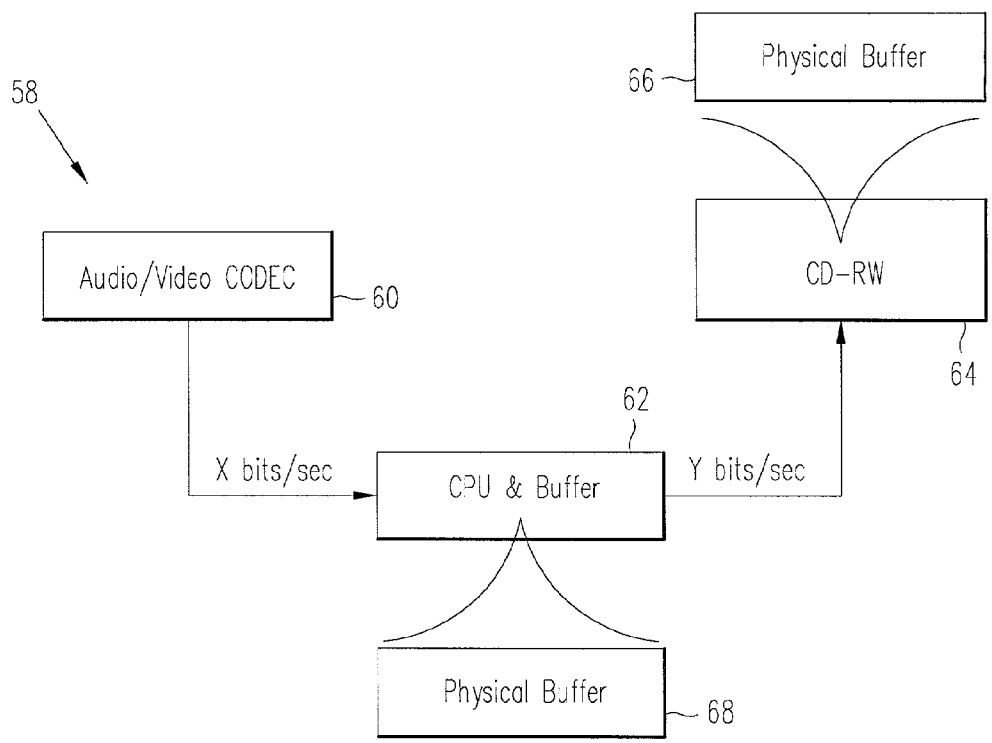

FIG. 6 illustrates the data flow in an audio/video recording system 58 is shown to include an audio/video codec 60, a central processing unit (CPU) 62 and a recordable compact disc drive 64 in accordance with an embodiment of the present invention.

Figure 7:
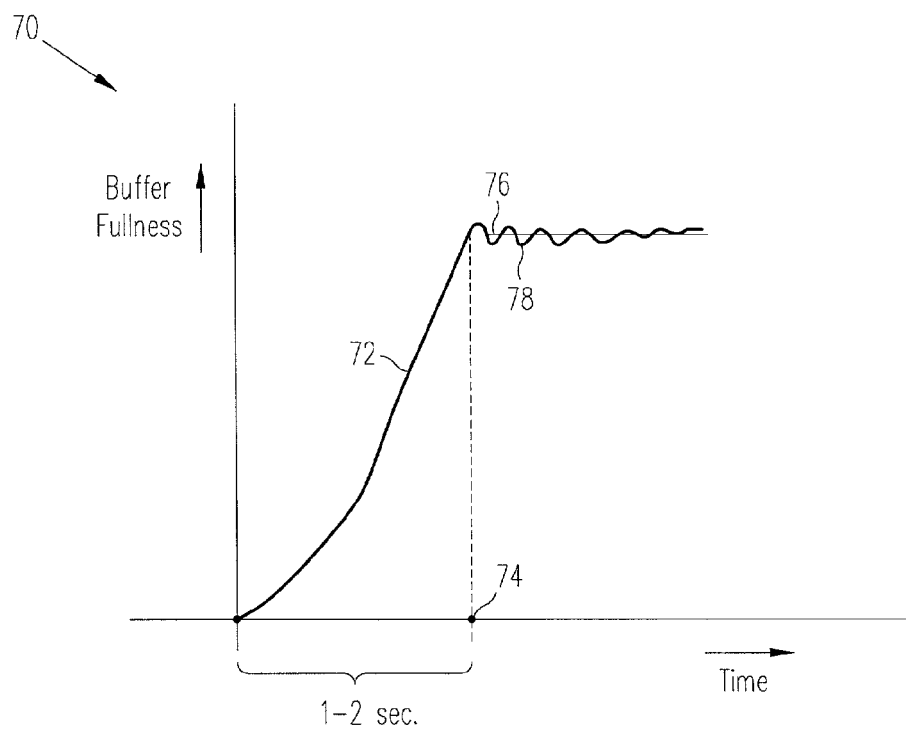

FIG. 7 shows a graph 70 of the fullness of the buffer 66 (shown in the y-axis) in relation to time (shown in the x-axis).

Figure 8:
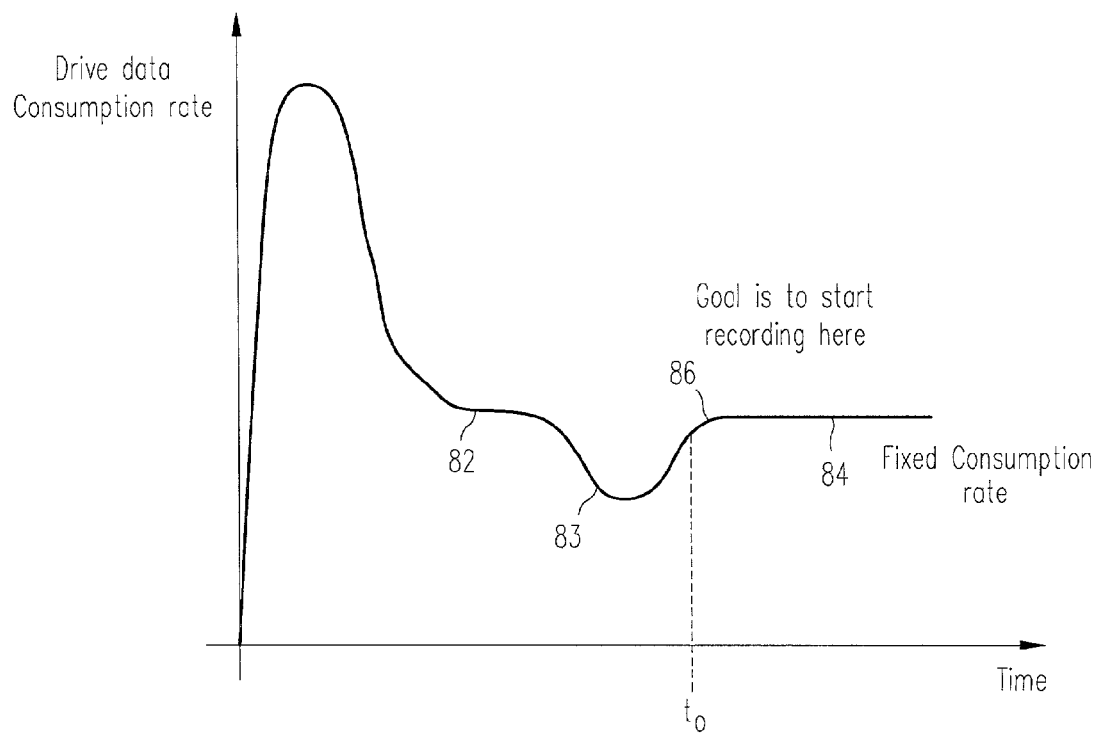

FIG. 8 shows a graph 80 of the data consumption rate of the drive (shown by the y-axis) vs. time (shown in the x-axis).

DETAILED DESCRIPTION OF THE PREFERRED EMBODIMENTS

Figure 1:
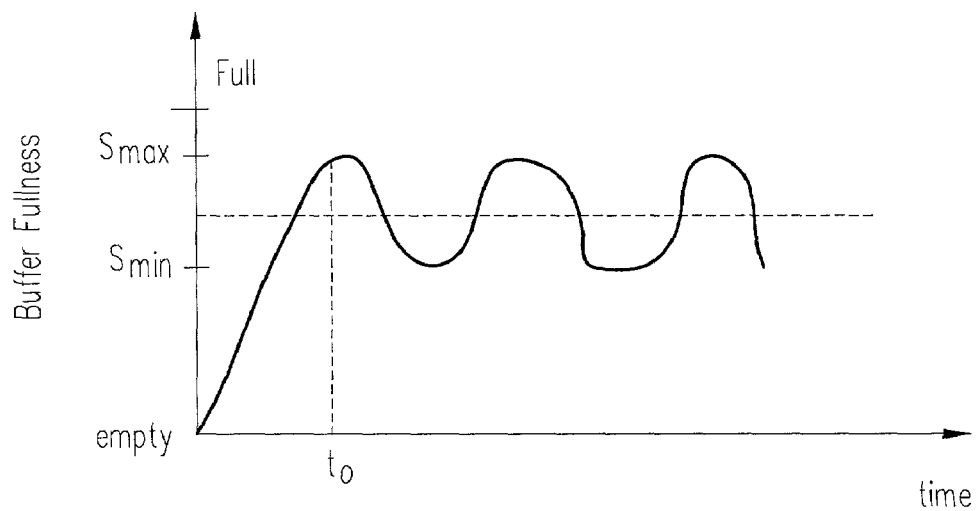
FIG. 1 shows a graph of buffer fullness vs. time for a prior art compact disc drive recording device in a PC system.
Figure 2:
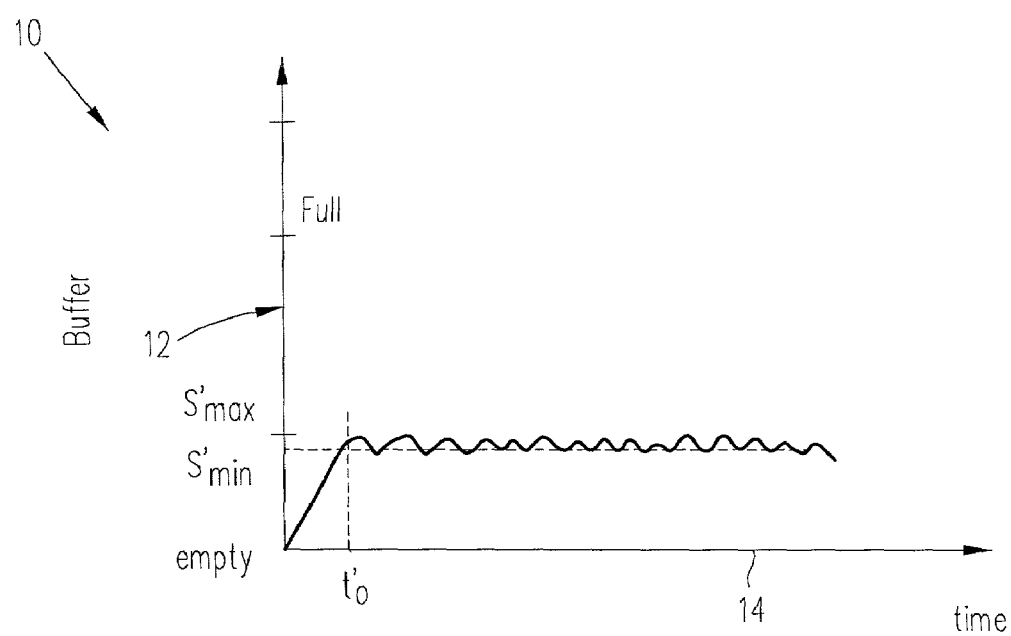
FIG. 2 shows a graph 10 to reflect the desirable relationship between buffer fullness, appearing on the y-axis of graph 10 at 12, and time at 14 during recording of a compact disc drive in accordance with an embodiment of the present invention.

Referring now to FIG. 2, a graph 10 is shown to reflect the desirable relationship between buffer fullness, appearing on the y-axis of graph 10 at 12, and time at 14 during recording on a compact disc drive in accordance with an embodiment of the present invention. That is, while recording in real-time, the response time to is substantially smaller than the response time, to time (in FIG. 1), of prior art systems and furthermore, the difference $S'_{max}$ to $S'_{min}$ of the embodiment of the present invention, as shown in FIG. 2, is smaller than the difference $S_{max}$ to $S_{min}$ of prior art systems, such as shown in FIG. 1.

Figure 3:
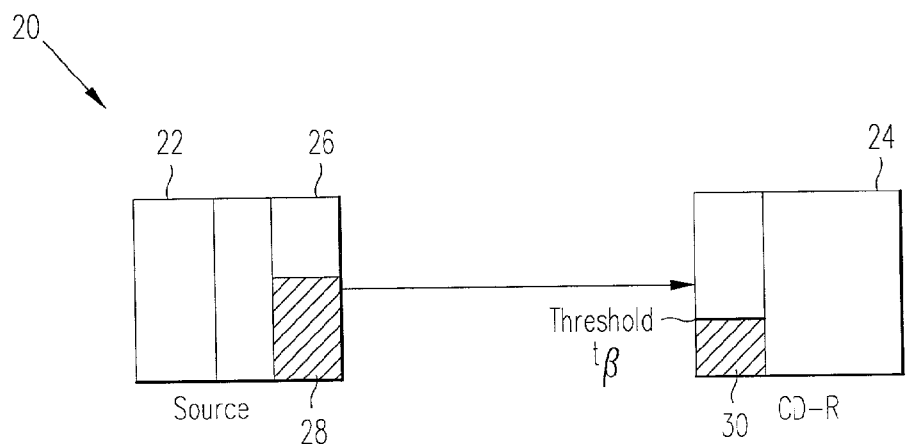
FIG. 3 shows an embodiment of the present invention to include a recordable compact disc system 20 having input and output buffers.

In FIG. 3, an embodiment of the present invention is shown to include a recordable compact disc system 20 having a source 22 of information to be recorded and a recordable compact disc drive (CD-R) 24 coupled to the source 22 for recording the information. Typically, the information to be recorded is audio and/or video with associated audio. The source 22 includes an output buffer 26 for storing the audio/video information, such as in the area 28 shown as shaded in FIG. 3. The stored audio/video information is transmitted to the CD-R 24 from the output buffer 26. The CD-R 24 includes an input buffer 30 for storing the transmitted audio/video information. The shaded area in buffer 30 represents stored data or information.

In accordance with the teachings of the present invention, as will be evident shortly, the output buffer 26 is prevented from overflowing while the input buffer 30 is prevented from underflowing. In one embodiment of the present invention, the source 22 is a Central Processing Unit (CPU) including the buffer 26 and compression/decompression (codec) capability. In other embodiments of the present invention, the buffer 26 may be located externally to the CPU.

Figure 4:
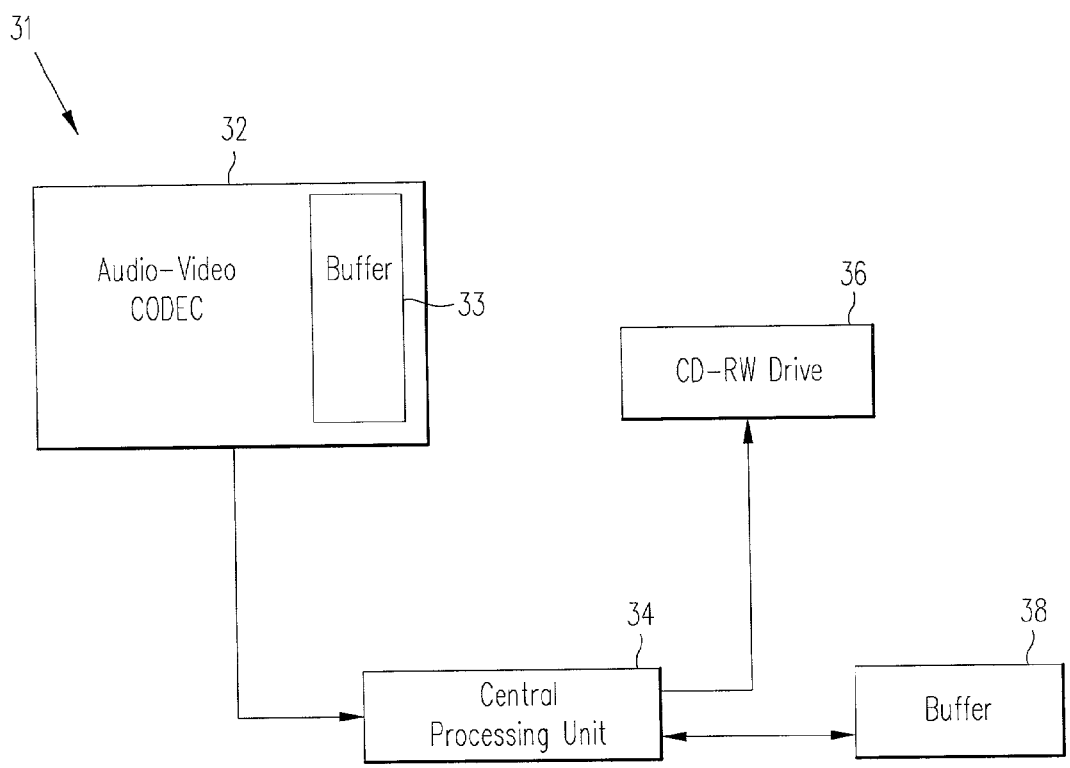
FIG. 4 shows a recordable compact disc system 31 in accordance with another embodiment of the present invention.

FIG. 4 shows a recordable compact disc system 31 in accordance with another embodiment of the present invention. In FIG. 4, the system 31 is shown to include an audio/video codec block 32 coupled to a CPU 34, which is coupled to a CD-RW drive 36 and a buffer 38. The audio/video codec block 32 serves as a source of the information to be recorded. Thus, audio/video information is transmitted from the codec block 32 to the CPU 34 at a fixed rate and in real-time. Similarly, the transmitted audio/video information need be transmitted to the CD-RW drive 36 at a fixed rate and in real-time. The challenge then becomes prevention of overflow of audio/video information in the codec block 32 and prevention of underflow of information by the drive 36. Overflow results in corruption of data or information due to data being re-written prior to being transmitted. Similarly, underflow results in incorrect recording of information, as the drive 36 expects information to be provided on a continuous basis.

The codec block 32 includes a buffer or storage unit 33 for storing the information that is to be recorded within the codec block. Also, prior to such storage, the audio or video information is compressed to reduce the size of the information for more efficient transmission thereof. The size of the buffer 33 depends, in part, on the type of compression algorithm employed and the size of audio/video files being recorded. In one embodiment of the present invention, the size of the buffer 33 is ½ Megabyte and the buffer 38 is a Synchronous Dynamic Random Access Memory (SDRAM), for example 300 Kilobytes in size at an operational speed of 8 nano seconds. It should be understood that the sizes, speed and type of memory disclosed herein are examples of various embodiments. Other sizes, speed and types of memory may be readily employed without departing from the scope and spirit of the present invention.

The goal is to record onto the drive 36, which requires data to be received at a constant rate (referred to as streaming data in real-time into real-time device, such as the drive 36). The drive 36 records information onto a compact disc, which would be ruined if data is not received at a continuous rate. This is because, compact discs use a laser beam for recording of information and one of the characteristics of laser is that once it is "on", it needs to continuously receive data otherwise it will shut itself off. This is due to the laser not being able to find where it left off unless there is a big gap in the recording of data. Once all of the data is written, a directory is created which specifies where different files reside within the tracks of the compact disc. Typically there are 99 tracks in a disc. This is very different than the requirements of a hard disc drive wherein the latter does not require data to be received at a continuous rate, as a hard disc drive is not a real-time device.

The CPU 34 stores information that is to be recorded in the buffer 38 prior to transmission thereof to the drive 36 for recording. By doing so, the CPU 34, at all times, attempts to keep the level of information stored within the buffer 33 at the same level as the buffer 38.

Accordingly, the present invention employs a unique buffering scheme for recording data or information, typically in the form of audio/video, in a recordable compact disc drive, in real-time, without causing loss of information.

The maximum speed of recording onto a compact disc by a recordable compact disc drive, such as the drive 36 is known, as this parameter determined by the manufacturer of the drive. For example, disc drive rates are known to be 1× or 2× representing the relative recording speed of the drive compared to the original specification for CD-R drives. For example, a 1× drive records at 1.5 Mbits/sec and a 2× drive records at 3 Mbits/s and so forth. Additionally, the average rate at which data is generated is known and is typically 2 Megabits per second. Knowing these parameters, overflow of the drive buffer, such as buffer 38 in FIG. 4 and buffer 30 in FIG. 3, is avoided by sending data from the source, such as 22 in FIG. 3 and 32 in FIG. 4, at a rate slightly lower than the maximum rate of the recordable disc drive. It has been the inventors' experience that sending data from the source at a rate that is 95% that of the maximum speed of the recordable disc drive avoids overflow of the drive buffer.

In one embodiment of the present invention, the buffer 33 is 800 Kilobytes and the buffer 38, for maintaining data consumption equilibrium, as will be discussed in further detail hereinbelow, is 300 Kilobytes. It is desirable to minimize the size of the buffer 38 in order to avoid frustrations experienced by the user resulting from a long delay from the time the user presses the stop button to stop recording and the time the video information that is being recorded is actually recorded to the point desired by the user. That is, the larger the size of the buffer, the longer the user will have to wait before the recording is actually done. Video information is typically transmitted at a rate of 1 Megabit/sec and if a 1 Megabyte-sized buffer is used, the user will have to wait approximately 7 seconds after pressing the stop button for the recording to be completed. This is obviously undesirable.

To avoid underflow of the recordable compact disc drive and overflow of the source buffer, the following steps, which are processed by the controller of the CD-R drive, such as the CPU 34 shown in FIG. 4, are performed.

After each write (or program) operation to the recordable disc drive, it is determined whether or not the source buffer includes additional data for recording onto the recordable disc drive, if so, the remaining data is written to the recordable disc drive. If not, a determination is made as to whether or not the buffer in the recordable disc drive is below a predetermined threshold (in FIG. 3, tB is an example of a predetermined threshold). If so, empty sectors are sent (streamed) to the recordable disc drive in order to keep a continuous data flow to the drive for reasons stated hereinabove. Empty sectors may include header information (information other than user data) but they do not include any user data information.

If the buffer within the recordable disc drive is not below a predetermined threshold, no action is taken with respect to the recordable disc drive and the source buffer is checked again for new data that may have been stored to the latter recently and that need be transferred to the recordable disc drive. The above steps are shown in flow chart form in FIG. 5.

Figure 5:
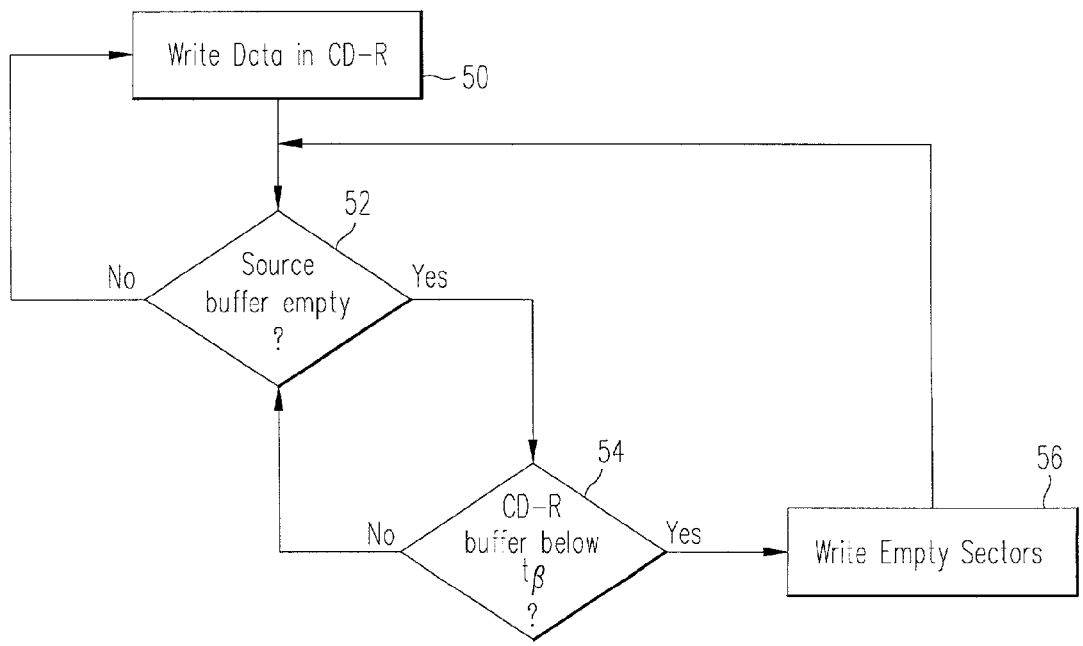
FIG. 5 shows a flow chart of some of the steps processed by a method of the present invention.

In FIG. 5, at step 50, data (or information in the form of audio/video or otherwise) is written to the recordable compact disc drive, such as 36 in FIG. 4 or 24 in FIG. 3. At step 52, a determination is performed as to whether or not the source buffer (in FIG. 4, the source buffer is 33 and in FIG. 3, the source buffer is the output buffer 26) is empty. If so, the process continues to step 54 at which point the recordable compact disc drive buffer (this buffer is buffer 38 in FIG. 4 and input buffer 30 in FIG. 3) is checked. That is, a determination is made at step 54 as to whether or not the amount of information included within the recordable compact disc drive buffer is below a predetermined threshold, tB, and if so, empty sectors are written to the recordable compact disc drive at step 56.

If at step 52, the source buffer is determined not to be empty, the process proceeds back to step 50 at which time data continues to be written to the recordable compact disc drive. In fact, the process goes back and forth between steps 52 and 50 until all data within the source buffer is written into the recordable compact disc drive.

At step 54, if it is determined that the amount of information within the recordable compact disc drive buffer is not below the threshold, tB, the process goes back to 52.

FIG. 6 illustrates the data flow in an audio/video recording system 58 shown to include an audio/video codec 60, a central processing unit (CPU) 62 and a recordable compact disc drive 64 in accordance with an embodiment of the present invention. The CPU 62 includes a buffer, which is optionally located externally to the CPU, as shown by the physical buffer 68. The drive 64 includes a buffer, which is optionally located externally to the drive, as shown by the physical buffer 66.

Data is transferred from the codec 60 to the CPU 62 at a fixed or constant rate, such as X bits per second. Similarly, data is transferred from the CPU 62 to the drive 64 for recording at a constant rate, such as Y bits per second. In the present invention, X is slightly less than Y. The buffer 68 compensates for the eventual underflowing of the drive 64 thereby preventing such underflow.

In fact, since X is guaranteed to be smaller than Y, Y is set equal to X+Z wherein Z is the rate of padding. That is, empty sectors are stuffed in the midst of data by and from the CPU to the drive and Z is the rate (bits/sec.) of padding of such empty sectors to compensate for the lower rate of X vis-à-vis Y. Without the use of empty sectors and because X is necessarily smaller than Y, the buffer 68 would underflow. On the other hand, if X was not designed to be necessarily less than Y, the buffer 68 would eventually overflow because the rate of data going to the drive 64 would eventually exceed the rate of data being provided to the compact disc to which the drive 64 writes. Accordingly, such overflow is avoided by ensuring that X is less than Y and underflow is avoided by adding empty sectors at a rate of Z such that X+Z=Y. It should be understood that data flowing from the codec 60 and eventually to the drive 64 is in the form of packets.

Once the buffer 66 is full, the rate of data consumption is determined by the speed at which the compact disc to which the drive 64 is writing is written. But whatever rate this may be, data is consumed at a constant rate once the buffer is full. This is better understood by a discussion of FIG. 7.

In FIG. 7, a graph 70 is shown of the fullness of the buffer 66 (shown in the y-axis) in relation to time (shown in the x-axis). Prior to the time the buffer 66 is full, at 72, the rate of consumption continues to increase. The rate of consumption is the first derivative (or slope) of this graph. At this point in time, data is obviously not being consumed (or recorded) at a constant rate. Since this is not desirable when writing to a compact disc operational by the use of laser (the reader is referred to an earlier discussion hereinabove of the reasons for avoiding writing at a non-constant rate), writing or recording of user (actual) data is avoided. Instead, empty sectors are written to the buffer 66 until the drive 64 is spun to a constant rate, which typically takes approximately 1 to 2 seconds. During 72 in FIG. 7, no data is being provided to the compact disc for recording.

Once data can be provided to the compact disc to which data is to be recorded at a constant rate, at the time indicated at 74 in FIG. 7, user or actual data is provided to the drive 64 at a constant rate of Y, which is necessarily smaller than the rate X. Accordingly, every so often, one or more empty sectors are stuffed into the data stream from the CPU 62 to the drive 64 to avoid underflow. Specifically, empty sectors are stuffed when two conditions are present. One condition is that consumption is at a constant rate and the other condition is that there is no data in the input buffer (buffer 68 in FIG. 6). In this manner, naturally, equilibrium between the two buffers, 68 and 66, is achieved. The stuffing of empty sectors is done to ensure avoiding underflowing. That is, empty sectors are used to avoid underflowing whereas underflowing or overflowing cannot be tolerated due to the corruption of data. Empty sectors are ignored during playing. That is, they are not actually played back. After 74, the drive 64 spins at its maximum rate of spin. In the graph 70, after 74, the desired buffer fullness should be almost constant as shown at 76 by a straight line. The line shown by 78 is an undesired and prior art outcome in that data is not being provided to the drive at a constant rate, as would be necessary. In FIG. 7, the slope of the curve at 72 is the data consumption rate.

A summary of the implementation of the buffer 66, in accordance with one embodiment of the present invention, is now presented. The buffer 66 is organized by linked lists in that many packets of data are allocated therein wherein each such packet is used to point to another storage location in which data may be stored or another pointer may be stored to point to yet another location in the buffer wherein data or yet another pointer is stored and so on. The implementation or organization of the buffer 66 is performed by the particular operating system used by the CPU 62. In a linked list, heads and tails are included in the storage areas with the heads including information regarding the presence of valid data. Through this information, it is ascertained whether or not additional data exists for recording. Data is available on a first-in-first-out basis where the data to have been stored first into the buffer is the first to be recorded. A queuing system may be used to implement storage and retrieval of information to and from the buffer.

In one embodiment of the present invention, empty sectors are written at the beginning or prior to the writing of user data in order to avoid recording at the outset. That is, empty sectors are stored in the buffer of the drive when a recordable compact disc system is first powered on until the buffer is full. Thereafter, user data is passed onto the buffer of the drive. This allows time for the drive to start spinning at a constant rate and for the data that is to be recorded to be provided at a constant rate (referred to as Y bits/sec hereinabove) and at a rate that is somewhat faster than the rate at which data is transferred from the codec to the CPU (referred to as Xbits/sec hereinabove). By the time the buffer is full and user data is being passed onto the drive, equilibrium is achieved in that data is recorded at a constant rate onto the compact disc. Data consumption equilibrium is achieved by the present invention in that data is consumed (or recorded) at a substantially constant rate as opposed to fluctuating. This is perhaps best understood by introducing a graph.

To ensure real-time operation of the drive, empty sectors are stuffed when the system is first powered-on in order to make sure that the drive starts to record data after it is being provided with the same at a constant rate. This is done because when the system is first powered-on, the drive behaves like a non-real time device and consumes as much data as it can.

FIG. 8 shows a graph 80 of the data consumption rate of the drive (shown by the y-axis) as a function of time (shown by the x-axis). When the system is first powered-on, at 82, the drive behaves non-linearly and data consumption rate is not constant. This is the time during which empty sectors are transferred to the drive. At 82, the rate at which the drive can receive data is faster that which the codec is able to provide, which is handled by stuffing empty sectors.

However, at 83, a problem is encountered in that suddenly, the rate of data (Y) that the drive can handle falls below the rate of the encoding (X). An overflow problem is encountered. Therefore, no data is allowed to be transferred to the drive and once constant rate of data is achieved, at 84 (after 86), user data is transferred to the drive while ensuring that X is less than Y. Thus, equilibrium is achieved with minimal amount of buffering (storage area) thereby avoiding user frustrations in waiting a long period time for the recording to stop.

Although the present invention has been described in terms of specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for recording audio/video information onto a compact disc recorder in real-time, comprising:

streaming audio/video information at a constant rate from a source having an output buffer and so as to prevent overflowing of the output buffer, the audio/video information to be recorded onto the compact disc recorder; and receiving the streamed audio/video information at a constant rate into an input buffer, the streamed audio/video information for recording thereof onto the compact disc recorder so as to prevent underflowing of the input buffer; and wherein the audio/video information is streamed from a source to central processing unit (CPU) at a constant rate of X bits per second and wherein the streamed audio/video information is streamed from the CPU to compact disc drive of the compact disc recorder at a constant rate of Y bits per second, wherein X is less than Y; and wherein the rate of streaming of empty sectors is Z bits per second and Y is equal to X+Z.

2. A method for recording audio/video information as recited in claim 1 wherein the streaming and receiving steps are performed in real-time.

3. A recordable compact disc system comprising:

a source for storing audio/video information to be recorded onto a compact disc drive, said source for causing streaming of the audio/video information at a constant rate;

a compact disc drive coupled to the source for receiving the streamed audio/video information at a constant rate, wherein the audio/video information is recorded onto the compact disc drive in real-time; and a central processing unit (CPU) coupled between the source and the compact disc drive, said CPU for temporarily storing the streamed information;

wherein said CPU includes a CPU buffer for temporarily storing the streamed audio/video information, said CPU for maintaining the level of information stored in the CPU buffer substantially the same as that of an output buffer;

wherein audio/video information is streamed from the source to the CPU at a constant rate of X bits per second and wherein the streamed audio/video information is streamed from the CPU to the compact disc drive at a constant rate of Y bits per second, wherein X is less than Y; and wherein the rate of streaming of empty sectors is Z bits per second and Y is equal to X+Z.

4. A recordable compact disc system as recited in claim 3 wherein the streaming is performed in real-time and the receiving of the streamed information is performed in real-time.

5. A recordable compact disc system as recited in claim 3 wherein said source includes an output buffer for storing the audio/digital information to be streamed.

6. A recordable compact disc system as recited in claim 5 wherein the output buffer is prevented from overflowing.

7. A recordable compact disc system as recited in claim 3 wherein said compact disc drive includes an input buffer for storing the received streamed audio/video information.

8. A recordable compact disc system as recited in claim 7 wherein said input buffer is prevented from underflowing.

9. A recordable compact disc system as recited in claim 8 wherein upon a determination that there is no audio/video information stored in an output buffer, a determination as to whether or not the level of information stored in the input buffer is below a predetermined threshold is made and if so, empty sectors are streamed so as to maintain a constant rate of streaming.

10. A recordable compact disc system as recited in claim 3 wherein the source includes means for compressing the audio/video information prior to streaming the same.

11. A recordable compact disc system as recited in claim 3 wherein the size of the CPU buffer is minimized so as to minimize the delay between commanding the stopping of audio/video recording and actual completion of the recording.

12. A recordable compact disc system as recited in claim 3 wherein the CPU buffer compensates for the underflowing of the compact disc drive thereby preventing such underflow.

13. A recordable compact disc system as recited in claim 3 wherein audio/video information is streamed from the source at a rate that is lower than the maximum rate of operation of the compact disc drive thereby avoiding overflow of the same.

14. A recordable compact disc system as recited in claim 13 wherein audio/video information is streamed from the source at a rate that is 95% that of the maximum speed of the compact disc drive thereby avoiding overflow of the compact disc drive.

15. A recordable compact disc system comprising:
   a source for storing audio/video information to be recorded onto a compact disc drive, said source for causing streaming of the audio/video information at a constant rate;
   a compact disc drive coupled to the source for receiving the streamed audio/video information at a constant rate, wherein the audio/video information is recorded onto the compact disc drive in real-time; and
   a central processing unit (CPU) coupled between the source and the compact disc drive, said CPU for temporarily storing the streamed information; and
   wherein said CPU includes a CPU buffer for temporarily storing the streamed audio/video information, said CPU for maintaining the level of information stored in the CPU buffer substantially the same as that of an output buffer;
   wherein the audio/video information is streamed from the source at a rate that is lower than the maximum rate of operation of the compact disc drive thereby avoiding overflow of the same; and
   wherein the audio/video information is streamed from the source at a rate that is 95% that of the maximum speed of the compact disc drive thereby avoiding overflow of the compact disc drive.

16. A recordable compact disc system as recited in claim 15 wherein the streaming is performed in real-time and the receiving of the streamed information is performed in real-time.

17. A method for recording audio/video information onto a compact disc recorder in real-time, comprising
   streaming audio/video information at a constant rate from a source having an output buffer and so as to prevent overflowing of the output buffer, the audio/video information to be recorded onto the compact disc recorder; and
   receiving the streamed audio/video information at a constant rate into an input buffer, the streamed audio/video information for recording thereof onto the compact disc recorder so as to prevent underflowing of the input buffer; and
   wherein the audio/video information is streamed from a source at a rate that is lower than a maximum rate of operation of a compact disc drive of the compact disc recorder thereby avoiding overflow of the same, and
   wherein the audio/video information is streamed from the source at a rate that is 95% that of the maximum speed of the compact disc drive to the compact disc the compact disc drive.

18. A method for recording audio/video information as recited in claim 17 wherein the streaming and receiving steps are performed in real-time.

* * * * *